(12) United States Patent
Ozaki et al.

(10) Patent No.: US 12,038,603 B2
(45) Date of Patent: Jul. 16, 2024

(54) MANUFACTURING METHOD OF OPTICAL MODULATOR

(71) Applicant: Nippon Telegraph and Telephone Corporation, Tokyo (JP)

(72) Inventors: Josuke Ozaki, Musashino (JP); Akinori Fujino, Musashino (JP); Naonori Ueda, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 279 days.

(21) Appl. No.: 17/772,758

(22) PCT Filed: Nov. 6, 2019

(86) PCT No.: PCT/JP2019/043536
§ 371 (c)(1),
(2) Date: Apr. 28, 2022

(87) PCT Pub. No.: WO2021/090412
PCT Pub. Date: May 14, 2021

(65) Prior Publication Data
US 2022/0413211 A1    Dec. 29, 2022

(51) Int. Cl.
*G02B 6/122* (2006.01)
*G02B 6/136* (2006.01)

(52) U.S. Cl.
CPC .............. *G02B 6/122* (2013.01); *G02B 6/136* (2013.01)

(58) Field of Classification Search
CPC .......... G02B 6/122; G02B 6/136; G02B 6/13; G02B 2006/12173; G02F 1/212
See application file for complete search history.

(56) References Cited

U.S. PATENT DOCUMENTS

| 6,436,613 B1 * | 8/2002 | Fallahi | G03F 7/0005 216/2 |
| 7,079,730 B2 * | 7/2006 | Fallahi | G03F 7/0005 385/39 |

(Continued)

FOREIGN PATENT DOCUMENTS

| CN | 105334575 A | * | 2/2016 | |
| CN | 107688210 A | * | 2/2018 | G02B 6/12 |

(Continued)

OTHER PUBLICATIONS

CN 105334575 A (English Translation) (Year: 2016).*

(Continued)

*Primary Examiner* — Michelle R Connelly
*Assistant Examiner* — Mary A El-Shammaa
(74) *Attorney, Agent, or Firm* — Workman Nydegger

(57) ABSTRACT

Provided is an optical modulator manufacturing method capable of determining the quality of an optical modulator having MMI waveguides and realizing improvement in yield during manufacturing. Here, in waveguide fabrication processes, hard mask material deposition, soft mask material application, exposure, and hard mask fabrication are executed, and then in hard mask width length measurement, the hard mask width for fabricating the MMI waveguide is measured at one or more locations. In hard mask width quality determination based on machine learning results, the quality of optical characteristics of the chip is predicted and determined in advance, based on sample data created in advance by analyzing a relationship between the hard mask width and optical characteristics of the optical modulator, depending on whether the hard mask width is present in a permissible range of the sample data. Depending on the result of the above-mentioned determination.

8 Claims, 3 Drawing Sheets

(56) References Cited

U.S. PATENT DOCUMENTS

| | | | | |
|---|---|---|---|---|
| 2011/0103733 A1* | 5/2011 | Tang | ................... | G02B 6/122 |
| | | | | 356/73.1 |
| 2013/0322817 A1* | 12/2013 | Tang | ................... | G02B 6/283 |
| | | | | 385/30 |
| 2019/0285801 A1* | 9/2019 | Adams | ................... | G02B 6/131 |
| 2024/0078422 A1* | 3/2024 | Meng | ................... | G06N 3/0675 |

FOREIGN PATENT DOCUMENTS

| | | | | |
|---|---|---|---|---|
| TW | I278718 B | * | 4/2007 | |
| WO | WO-2018131227 A1 | * | 7/2018 | ............. G02F 1/017 |

OTHER PUBLICATIONS

CN 107688210 A (English Translation) (Year: 2018).*
TW 1278718 B (English Translation) (Year: 2007).*
WO 2018131227 A1 (English Translation) (Year: 2018).*
Y. Ueda et al., *InP PIC Technologies for High-Performance Mach-Zehnder Modulator*, Proc. of SPIE, vol. 10129, Jan. 28, 2017, pp. 1-7.

* cited by examiner

MANUFACTURING METHOD OF OPTICAL MODULATOR

TECHNICAL FIELD

The present invention relates to a method for manufacturing an optical modulator that is an optical device having multi-mode interference (hereinafter, referred to as MMI) waveguides.

BACKGROUND ART

In recent years, with the explosive increase in the amount of data communications, increasing the capacities of optical communication systems is required. Further, integration, complication, and signal speeding-up of optical devices used in the optical communication systems are underway.

Examples of such optical device include optical modulators. Recently, in order to increase the transmission capacity, there are many opportunities to use optical I/Q modulators that perform I/Q modulation, as examples of the optical modulator. However, in the waveform, "I" indicates an in-phase component and "Q" indicates a quadrature-phase component. The optical I/Q modulator is based on a Mach-Zehnder (hereinafter, referred to as MZ) type optical modulator that copes with various multi-level modulations. An example of the multi-level modulation is quadrature phase shift keying (QPSK). Further, another example of the multi-level modulation is 16 quadrature amplitude modulation (QAM).

On the other hand, there are problems such as miniaturization of optical transmitter modules, and reduction in driving voltage. Therefore, research and development on semiconductor MZ-type optical modulators (hereinafter, referred to as MZ-type optical modulators) that are compact and capable of reducing the driving voltage is enthusiastically underway. In the case of MZ-type optical modulators, the manufacturing thereof includes very complicated processing processes, including many fabricating/backfilling processing processes, performed in such a manner that a semiconductor is first formed by etching, crystal regrowth is then carried out again, backfilling is performed, and further the semiconductor is etched again. Therefore, it is said that attaining a stable and high yield is difficult, and strict process management is regarded as being very important.

By the way, it is conventionally impossible to accurately estimate post-fabrication optical characteristics during fabrication processes in the manufacturing of optical devices such as MZ-type optical modulators. Therefore, at the stage of optical characteristic evaluation such as external appearance inspection preceding the completion of a wafer, the optical characteristics are evaluated in detail and the quality is determined. However, according to such a method, not only non-defective products but also defective products are subjected to the implementation in the flow from fabrication to inspection, which contributes to the increase in cost of chips to be produced. Further, it is impossible to accurately determine the quality of the optical characteristics during fabrication processes. A situation in which the yield suddenly decreases on the wafer may occur, which is a serious problem.

In general, MZ-type optical modulators are made into chips after the completion of fabrication processes and then the optical characteristics are measured and evaluated, and further the quality of the optical characteristics is determined. The optical characteristics include extinction ratio, insertion loss, and the like. Reaching the inspection stage after completing all the fabrication processes is taken into consideration, it takes a very long time. Therefore, the occurrence of defective products after inspection leads to a factor that greatly increases manufacturing costs. Therefore, making it possible to determine the quality of the optical characteristics at the earliest possible stage without waiting for the reaching to the inspection is important to suppress the manufacturing costs. Specifically, realization of determining the quality of the optical characteristics by inspection during the fabrication processes, not performing the measurement and evaluation in the case of products handled as being defective, and stopping the wafer manufacturing halfway, or redoing the processes in the middle for correction is very effective in cost reduction.

When an optical modulator having MMI waveguides is taken as an example, the optimum value of the MMI waveguide width greatly affects the optical characteristics and it is considered that managing this value is very important. Regarding the optimum value of the MMI waveguide width, the optimum MMI waveguide width is often different between a simulation-based design value and an actually fabricated MMI waveguide width. In such a case, if the optical modulator is manufactured using the design value as an index, the variation of the MMI waveguide width during the fabrication processes will raise a problem that the yield may suddenly decrease significantly.

As a well-known technique related to the manufacturing of the optical modulator having MMI waveguides, Non-Patent Literature 1 discloses an MZ-type optical modulator that is configured so as to include a substrate material with indium phosphide InP serving as a base and MMI optical waveguides. According to this MZ-type optical modulator, it is explained that the optical characteristics can be improved if the width of an MMI waveguide fabrication mask for fabricating the MMI optical waveguides is set to an appropriate value when the waveguides are manufactured. However, in this MZ-type optical modulator, no consideration is given to a specific technique for realizing an improvement of the yield in manufacturing processes. Therefore, even if the technique described in Non-Patent Literature 1 is applied, it is difficult in the manufacturing processes to determine the quality of chips having MMI waveguides in the middle of the manufacturing and realize the improvement in yield.

CITATION LIST

Non-Patent Literature

Non-Patent Literature 1: InP PIC technologies for high-performance Mach-Zehnder modulator (28 Jan. 2017)

SUMMARY OF THE INVENTION

Embodiments according to the present invention have been made to solve the above-mentioned problems. The embodiments according to the present invention intend to provide an optical modulator manufacturing method capable of determining the quality of an optical modulator having MMI waveguides during manufacturing and capable of realizing the improvement in yield.

To achieve the above-mentioned object, an aspect of the present invention is a method for manufacturing an optical modulator having an MMI waveguide, and is characterized by including a mask width length measurement step of measuring a mask width for waveguide fabrication used for fabricating the MMI waveguide existing in a chip of the optical modulator, at least at one location, a chip quality determination step of predicting and determining the quality of optical characteristics of the chip in advance, based on sample data of the optical modulator created in advance by analyzing a relationship between the mask width for waveguide fabrication and optical characteristics of the optical modulator by machine learning, depending on whether the mask width for waveguide fabrication measured in the mask width length measurement step is present in a permissible range of the sample data, and a mask refabrication step of redoing mask fabrication when the mask width for waveguide fabrication measured in the mask width length measurement step deviates from a target waveguide mask width, if a prediction determination result in the chip quality determination step indicates that the frequency of indicating defective optical characteristics reaches a predetermined degree.

Adopting the above-mentioned processes can determine the quality of the optical modulator having the MMI waveguide during manufacturing and can realize the improvement in yield.

BRIEF DESCRIPTION OF DRAWINGS

FIG. 1(A) is a plan view illustrating the semiconductor polarization multiplexing type optical I/Q modulator seen from the upper surface direction. FIG. 1(B) is a plan view schematically illustrating an assumption in which the semiconductor polarization multiplexing type optical I/Q modulator is divided into two parts as single polarization I/Q modulators. FIG. 1(C) is a plan view of the line division illustrated for explaining existence locations of MMI waveguides with respect to X and Y polarizations in the semiconductor polarization multiplexing type optical I/Q modulator.

FIG. 3(A) is a flowchart illustrating the waveguide fabrication in process order according to embodiment 1 of the present invention. FIG. 3(B) is a flowchart illustrating general waveguide fabrication in process order.

DESCRIPTION OF EMBODIMENTS

Hereinafter, an optical modulator manufacturing method according to an embodiment of the present invention will be described with reference to the attached drawings.

Embodiment

Figure 1:
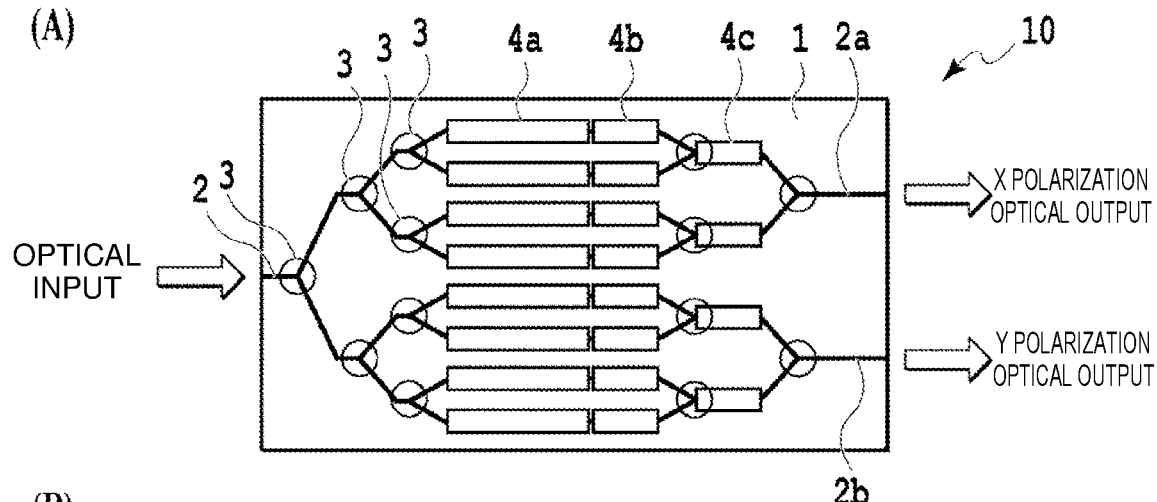
FIG. 1 is a schematic diagram illustrating a functional configuration of a semiconductor polarization multiplexing type optical I/Q modulator, which is an exemplary optical modulator to be manufactured by an optical modulator manufacturing method of the present invention.
Figure 1:
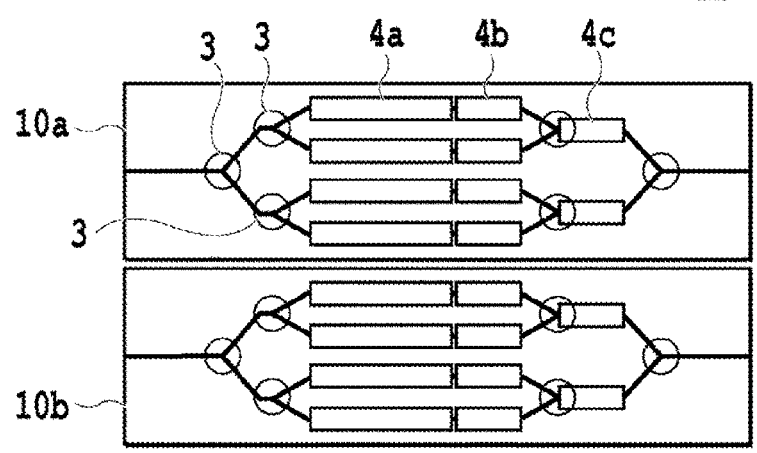
Figure 1:
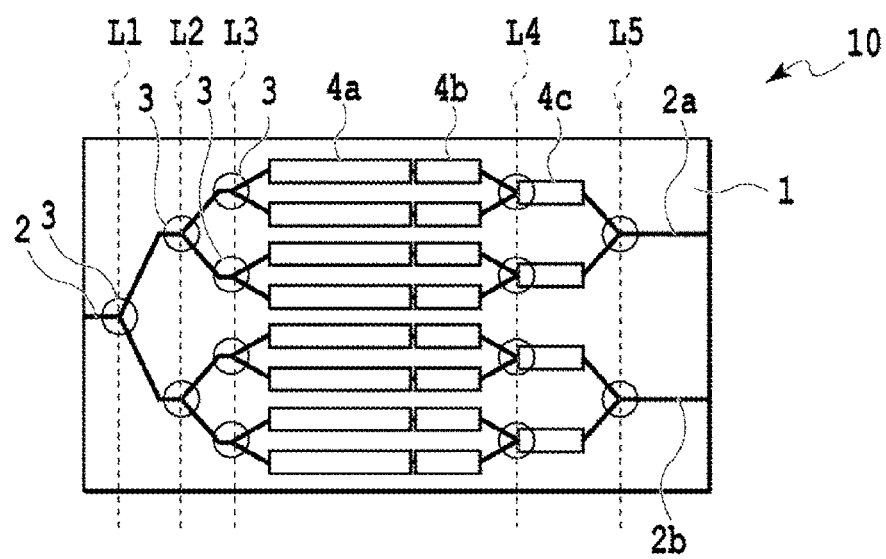

FIG. 1 is a schematic diagram illustrating a functional configuration of a semiconductor polarization multiplexing type optical I/Q modulator (hereinafter, referred to as a polarization multiplexing type optical I/Q modulator) 10, which is an exemplary optical modulator to be manufactured by the optical modulator manufacturing method of the present invention. FIG. 1(A) is a plan view illustrating the polarization multiplexing type optical I/Q modulator 10 seen from the upper surface direction. FIG. 1(B) is a plan view schematically illustrating an assumption in which the polarization multiplexing type optical I/Q modulator 10 is divided into two parts as single polarization I/Q modulators 10a and 10b. FIG. 1(C) is a plan view of the line division illustrated for explaining existence locations of MMI waveguides 3 with respect to the X polarization and the Y polarization in the polarization multiplexing type optical I/Q modulator 10.

The polarization multiplexing type optical I/Q modulator 10 is disclosed in the above-mentioned Non-Patent Literature 1 and is an MZ-type optical modulator that is configured so as to include a semiconductor substrate 1 made of an InP material and serving as a base, and MMI optical waveguides 3. In the fabrication of the polarization multiplexing type optical I/Q modulator 10, it is generally configured in such a manner that branched optical waveguides performing optical input are formed on an upper surface of the semiconductor substrate 1, electrodes are provided to perform control/operation corresponding to the number of branches, and two-system optical outputs of X polarization and Y polarization are obtained through multiplexing of the branches.

With reference to FIG. 1(A) and FIG. 1(C), existence locations of the MMI waveguides 3 of the polarization multiplexing type optical I/Q modulator 10 will be described. On the optical input side, there are eight waveguides formed in the transverse direction on the upper surface of the semiconductor substrate 1 so as to extend through three-stage branching from one optical waveguide 2 for the optical input, and a total of 7 branched portions existing on lines L1, L2, and L3 consisting of three rows in the longitudinal direction serve as the MMI waveguides 3. At a linear part of each of the eight waveguides in the transverse direction, a long control/operation electrode 4a and a short control/operation electrode 4b are connected in series.

Further, on the optical output side, there are two waveguides formed in the transverse direction, as two optical waveguides 2a and 2b for the optical outputs of X polarization and Y polarization, through 2-stage branch multiplexing from the eight waveguides in the transverse direction on the upper surface of the semiconductor substrate 1. Further, on the optical output side, a total of six branched portions existing on lines L4 and L5 consisting of two rows in the longitudinal direction serve as the MMI waveguides 3. Further, on the optical output side, another short control/operation electrode 4c is connected at a linear part of four waveguides in the transverse direction each extending from the branch multiplexing portion of the line L4 consisting of the first row to the branch multiplexing portion of the line L5 consisting of the second row.

In short, when the polarization multiplexing type optical I/Q modulator 10 is fabricated, it is necessary to form eight waveguides in the transverse direction through three-stage branching from one optical waveguide 2 and form two optical waveguides 2a and 2b for the optical outputs of X polarization and Y polarization through branch multiplexing. Here, a total of 13 MMI waveguides existing on the lines L1 to L5 consisting of five rows in the longitudinal direction are used as the MMI waveguides 3 responsible for the operations of the branching and the multiplexing. Since the polarization multiplexing type optical I/Q modulator 10 is structured symmetrically for X polarization and Y polarization, the MMI waveguides 3 existing on the lines L2 to L5 are present on the lines L2 to L5 constituting the same rows in the longitudinal direction for X polarization and Y polarization, for example.

Further, when FIG. 1(B) illustrating a reference configuration is referred to, in the case where the polarization multiplexing type optical I/Q modulator 10 is divided into two as single polarization I/Q modulators 10a and 10b, the above-mentioned one optical waveguide 2 for the optical input on the optical input side does not exist. Therefore, each of the single polarization I/Q modulators 10a and 10b requires a total of six MMI waveguides 3. Here, it may be possible to adopt a layout in which the number of the MMI waveguides 3 is intentionally increased. However, it is desired to design the MMI waveguides 3 as less as possible since each MMI waveguide is one of factors that give adverse influence on optical characteristics. Further, when the density of a waveguide pattern and the stability of processes are taken into consideration, it is general that the waveguide pattern is symmetrically structured for X polarization and Y polarization. That is, although it is possible to change the positions of the MMI waveguides 3 between X and Y polarizations and I/Q, since the same layout is adopted for the above-mentioned reason, the MMI waveguides 3 are arranged in the same row in the longitudinal direction.

Next, functions of the MMI waveguides 3 will be described. The MMI waveguides 3 are used to branch and multiplex the incident light that has propagated through the waveguides so that it is propagated to the emission-side waveguides. It is known that if the finished size of the MMI waveguide 3 greatly deviates from the designed optimum values with respect to the length, width, or the like of the MMI waveguide 3, the optical characteristics (particularly, extinction ratio and insertion loss) are greatly deteriorated. This means that the general MMI to be used in the optical modulator made of InP material has wavelength dependency, and when the size deviates from optimum values, wavelength characteristics on the long wave side or on the short wave side greatly deteriorate within the wavelength range to be used, and defective products may be fabricated. Regarding the above-mentioned wavelength dependency, for example, excess loss of MMI is assumed to have the shape of an upwardly convex quadratic curve when drawn, in the case of the horizontal axis representing the wavelength and the vertical axis representing the excess loss of MMI.

Under these circumstances, it can be said that managing the size (particularly, width and length) of the MMI waveguide 3 is very important. Particularly, in general, the shape of the MMI waveguide 3 is very small in width than in length. Further, the width of the MMI waveguide 3 is sensitive to size fluctuations. Therefore, it is considered that managing the width of the MMI waveguide 3 is most important. For example, the length of the MMI waveguide 3 is often about 10 to 20 times the width of the MMI waveguide 3. On the other hand, the width of the MMI waveguide 3 is often 10 μm or less. The management at least on the submicron order is required.

Figure 2:
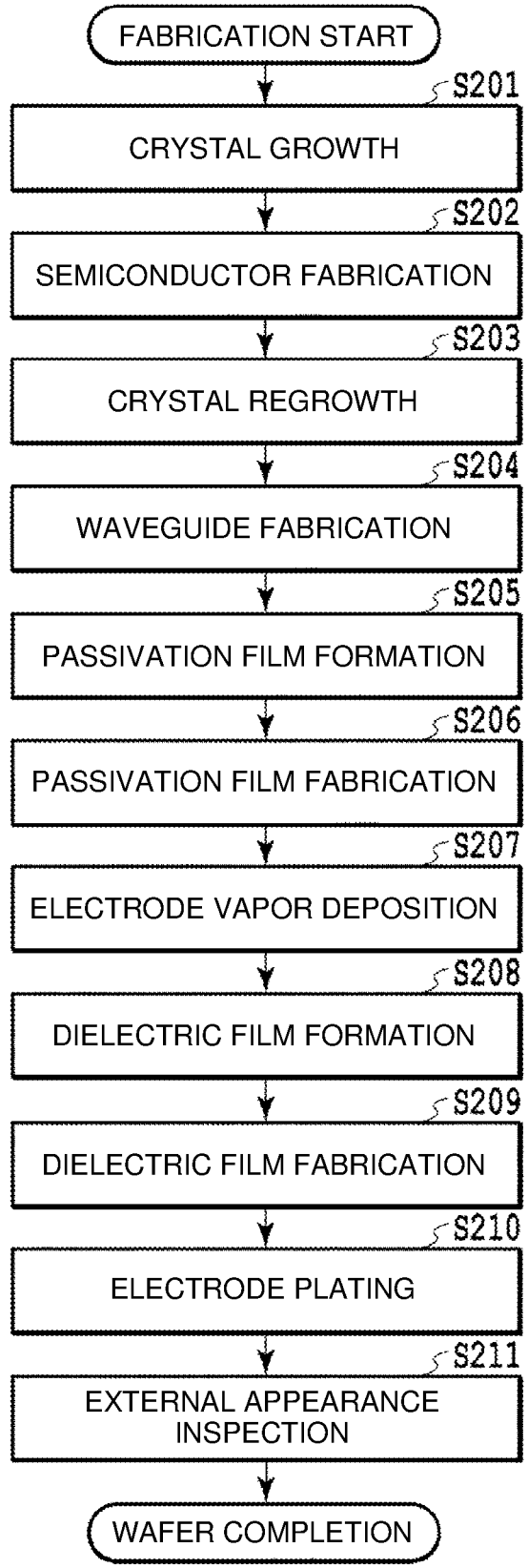
FIG. 2 is a flowchart schematically illustrating wafer fabrication in process order according to a well-known MZ-type optical modulator manufacturing method.

FIG. 2 is a flowchart schematically illustrating wafer fabrication in process order according to a well-known MZ-type optical modulator manufacturing method. In the following description, fabrication processes and manufacturing processes have the same meaning, and the processing indicates the process.

When FIG. 2 illustrating the processes of the wafer fabrication is referred to, upon starting the wafer fabrication, first, in processing of crystal growth (step S201), crystal growth of a semiconductor serving as a substrate is carried out using indium phosphide InP as a material. As another alternative material, gallium arsenide GaAs, silicon Si or the like may be used. Next, in processing of semiconductor fabrication (step S202), the semiconductor substrate is formed into a desired shape by etching or the like. Further, in processing of crystal regrowth (step S203), the crystal regrowth is carried out on the fabricated semiconductor substrate.

Subsequently, in processing of waveguide fabrication (step S204), the upper surface of the semiconductor substrate is covered with a thin film made of silicon dioxide $SiO_2$ or the like, and an optical waveguide is formed according to a preset fine waveguide pattern. The optical waveguide is configured by covering a core serving as a light passage with a clad. Further, in processing of passivation (insulating) film formation (step S205), an insulating film is formed to cover the optical waveguide. Subsequently, in processing of passivation (insulating) film fabrication (step S206), an unnecessary insulating film is removed by etching or the like so that an electrode forming location can be obtained.

Further, in processing of electrode vapor deposition (step S207), a metal gas or the like is vapor deposited on the electrode forming location to provide an electrode. Subsequently, in processing of dielectric film formation (step S208), a dielectric film is formed at a location where insulation is required. Further, in processing of dielectric film fabrication (step S209), an unnecessary dielectric film is removed by etching or the like so as to secure a location to be subjected to electrode plating.

Subsequently, in processing of electrode plating (step S210), the secured area is subjected to the electrode plating. Finally, processing of external appearance inspection (step S211) is carried out, and if the defect does not become a factor for certifying defective products, the wafer completes. However, the processing of external appearance inspection (step S211) alone may cause oversight, an additional measurement evaluation is often performed.

As mentioned above, the wafer processes complete if there is no factor for certifying defective products as a result of performing the wafer external appearance inspection through the crystal growth of a semiconductor, fabrication of the semiconductor substrate, formation of the electrode, and the like. However, in the flow of the wafer fabrication processes related to such a general MZ-type optical modulator manufacturing method, since the quality determination and the redoing process during the fabrication processes are not assumed, the quality determination is carried out at a post-fabrication external appearance inspection. Therefore, if there is the redoing of the fabrication processes in the wafer external appearance inspection, it becomes a factor that increases the manufacturing costs required until the optical characteristics of the MZ-type optical modulator are determined to be non-defective.

Therefore, the present invention intends to realize determining the quality of the optical characteristics by inspection during the wafer fabrication processes, not performing the measurement and evaluation of the optical characteristics in the case of products handled as being defective, and stopping the wafer manufacturing halfway, or redoing the processes in the middle for correction or the like. As a result of repeated researches and experiments, the present inventors have discovered that, among the wafer manufacturing processes described with reference to FIG. 2, the occurrence of defects in optical characteristics is particularly high in the processing of waveguide fabrication (step S204). Therefore, they have found that if the inspection is carried out in this processing and the redoing is carried out, when necessary, the quality of the optical characteristics can be determined at an early stage without waiting for the result of the processing of external appearance inspection (step S211), and the yield can be prevented from decreasing and the improvement in yield can be realized.

Figure 3:
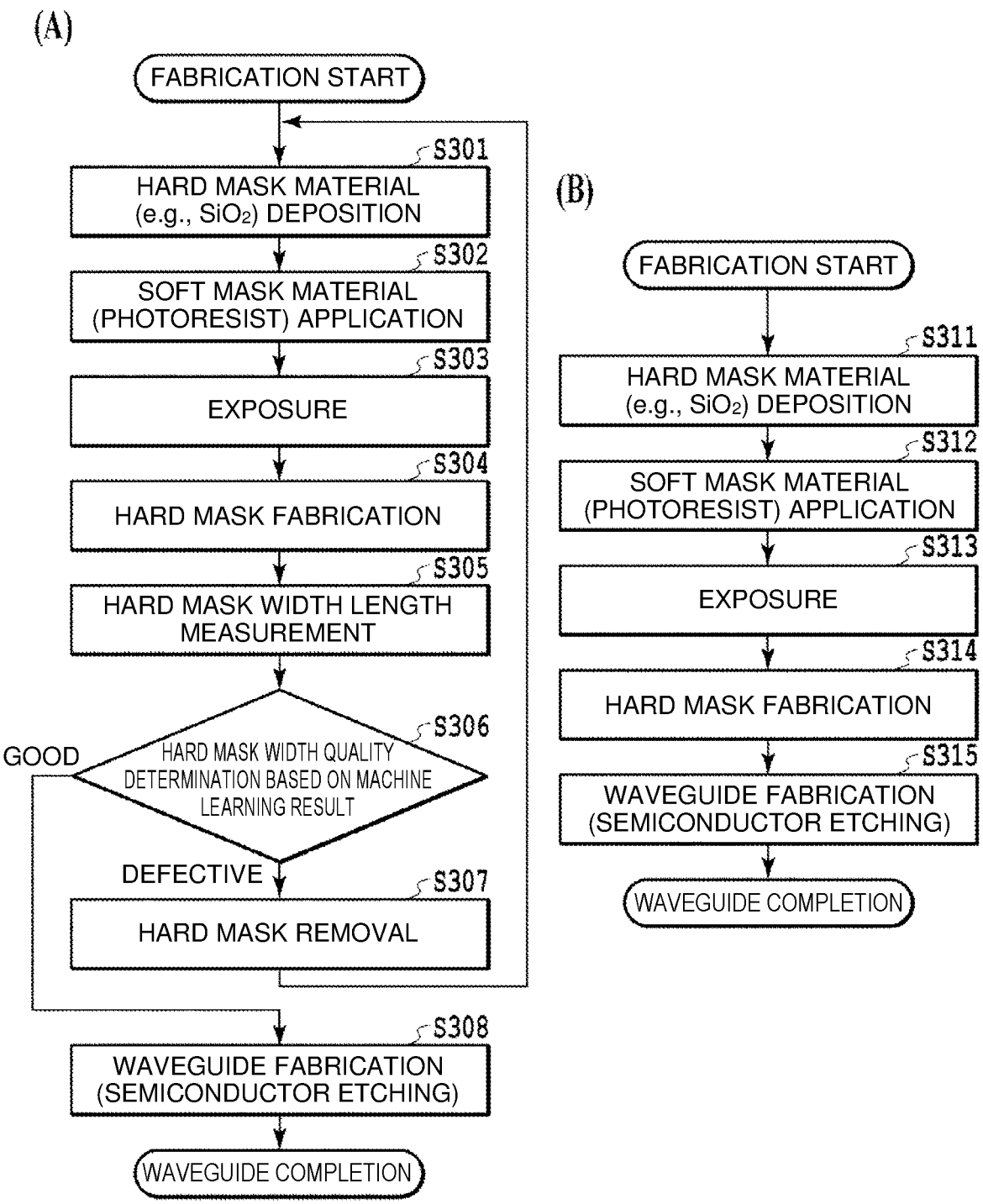
FIG. 3 is a flowchart illustrating waveguide fabrication in process order as essential processes of the method for manufacturing the semiconductor polarization multiplexing type optical I/Q modulator illustrated in FIG. 1.

FIG. 3 is a flowchart illustrating waveguide fabrication in process order as essential processes of the method for manufacturing the above-mentioned polarization multiplexing type optical I/Q modulator 10. FIG. 3(A) is a flowchart illustrating the waveguide fabrication in process order according to embodiment 1 of the present invention. FIG. 3(B) is a flowchart illustrating general waveguide fabrication in process order. The processing of waveguide fabrication (step S204) in the fabrication processes of the MZ-type optical modulator described with reference to FIG. 2 can be replaced with the waveguide fabrication including essential fabrication processes according to the method for manufacturing the polarization multiplexing type optical I/Q modulator 10. Further, applying other fabrication processes according to the same procedure as that of the fabrication processes of FIG. 2 can manufacture the polarization multiplexing type optical I/Q modulator 10.

When FIG. 3(A) is referred to, in the waveguide fabrication processes, first, as processing of hard mask material deposition (step S301), a hard mask material made of $SiO_2$ or the like is deposited on the upper surface of the semiconductor substrate on which the crystal regrowth has been carried out. Subsequently, in processing of soft mask material application (step S302), a soft mask material serving as a photoresist is applied on the upper surface of the hard mask material. Further, as processing of exposure (step S303), the exposure is performed by patterning and drawing a desired waveguide pattern (including the MMI waveguides 3) on the soft mask material with a drawing device. The exposure leaves the resist mask width. Further, as processing of hard mask fabrication (step S304), the hard mask material is fabricated into a desired shape by etching or the like.

Subsequently, in processing of hard mask width length measurement (step S305), a mask width length measurement step is executed. This mask width length measurement step is for measuring, at least at one location, the length of a mask width for waveguide fabrication to be used to fabricate the MMI waveguide 3 existing in the chip of the polarization multiplexing type optical I/Q modulator 10. Further, in processing of hard mask width quality determination (step S306) based on machine learning results, a chip quality determination step is executed. This chip quality determination step uses sample data of the polarization multiplexing type optical I/Q modulator 10 created in advance by analyzing a relationship between the mask width for waveguide fabrication and the optical characteristics of the optical modulator by machine learning and by swinging the width of the MMI waveguide 3 in a predetermined range. Specifically, in the chip quality determination step, the quality of the optical characteristics of the chip is predicted and determined in advance depending on whether the mask width for waveguide fabrication measured in the mask width length measurement step (step S305) is present in a permissible range of the sample data.

When it is determined that the hard mask width is defective (NO) as a result of the above-mentioned processing of determination (step S306), and if the frequency of indicating defective optical characteristics reaches a predetermined degree (ratio), the mask is refabricated. In the mask refabrication, processing of hard mask removal (step S307) is performed and then the fabrication process flow returns to the processing of hard mask material deposition (step S301). This flow means the refabrication of the mask, and a mask refabrication step is carried out. The mask width for waveguide fabrication at the initial stage and at the time of mask refabrication can be exemplified by, for example, setting to an optimum value of the waveguide mask width estimated immediately before by a regression model described below. This mask refabrication step is performed when the mask width for waveguide fabrication measured in the mask width length measurement step (step S305) deviates from the target waveguide mask width. The present embodiment exemplarily illustrates the case where the mask is refabricated when a result of prediction determination by machine learning indicates that the frequency of defect (NO) determination reaches a predetermined ratio, which is 10% or more by the number of chips. In other words, even if the result of the above-mentioned processing of determination (step S306) indicates that the hard mask width is determined as being defective (NO), when the frequency does not reach 10%, the fabrication process flow proceeds to processing of waveguide fabrication (step S309), like the case where it is determined that the hard mask width is non-defective.

In the mask width length measurement step (step S305), the mask width for waveguide fabrication (hard mask width) is measured at least at one location of all stages existing in the chip of the polarization multiplexing type optical I/Q modulator 10. Further, in the chip quality determination step, the quality of the optical characteristics of the chip is predicted and determined using the mask width for waveguide fabrication (hard mask width) at least at one location of all stages. The optical characteristics of the chip include extinction ratio, insertion loss, and the like, and it is desired to use three or more types of optical characteristics data. Further, in the chip quality determination step, the optimum value of the waveguide mask width is calculated by machine learning based on the mask width for waveguide fabrication (hard mask width) to be measured and at least three types of optical characteristics of the polarization multiplexing type optical I/Q modulator 10. Details of the machine learning will be described in detail below.

By the way, if the waveguide fabrication (step S309) is carried out in a state where there is a deviation between the mask width for waveguide fabrication (hard mask width) and the target waveguide mask width, it is generally known that it becomes a factor that induces deterioration in optical characteristics. Therefore, this embodiment intends to carry out the mask refabrication step. In the mask refabrication step, when the hard mask width deviates from the target waveguide mask width, if the prediction determination result in the chip quality determination step indicates that the frequency of indicating defective optical characteristics has reached the predetermined degree, the mask is refabricated. As mentioned above, the predetermined degree corresponds to the case where the deviation of the hard mask width from the target waveguide mask width reaches 10% or more in the number of chips on the wafer surface configured by a chip group. The above predetermined degree is an example of the use of statistical processing based on the above-mentioned machine learning and can be appropriately changed.

Further, if the result of the above-mentioned processing of determination (step S306) indicates that the mask width for waveguide fabrication (hard mask width) is determined as being good (GOOD), the fabrication process flow proceeds to the processing of waveguide fabrication (step S309). The processing of waveguide fabrication (step S309) is carried out when the frequency does not reach 10%, even if the hard mask width is determined to be defective, as mentioned above. In the processing of waveguide fabrication (step S309), waveguide fabrication is carried out on the upper surface of the semiconductor substrate after the previous processing of hard mask fabrication (step S304) according to a preset fine waveguide pattern. As a result, an optical waveguide is formed and the waveguide is completed.

When FIG. 3(B) is referred to, in the general waveguide fabrication processes, the processing of step S305, the processing of step S306, and the processing of step S307 illustrated in FIG. 3(B) are not performed. That is, in the waveguide fabrication processes, processing of hard mask material deposition (step S311), processing of soft mask material application (step S312), processing of exposure (step S313), and processing of hard mask fabrication (step S314) are performed. Further, subsequently, processing of waveguide fabrication (step S315) is carried out continuously, and the flow reaches completion of the waveguide.

Even in the general waveguide fabrication processes, it may be possible to observe the mask width or the like. However, in this case, it is assumed that a very small number of locations such as several locations are observed in the entire wafer. In the case of the present embodiment, after the processing of hard mask fabrication (step S304), the mask width for waveguide fabrication (hard mask width) is measured at least at one location for each chip in the mask width length measurement step (step S305). Further, in the chip quality determination step, the relationship between the mask width for waveguide fabrication (hard mask width) measured by machine learning and the optical characteristics of the polarization multiplexing type optical I/Q modulator 10 is analyzed and sample data is created in advance. Further, depending on whether the mask width for waveguide fabrication (hard mask width) measured in the mask width length measurement step (step S305) is present in the permissible range of the sample data, the quality of the optical characteristics of the chip is predicted and determined in advance. Further, referring to the result of the prediction determination in the hard mask width quality determination (step S306) based on machine learning results, if the frequency of indicating defective optical characteristics reaches the predetermined degree, the mask fabrication is carried out again.

As a result, the quality of the optical characteristics of the chip can be determined at early stage, without waiting for the result of the external appearance inspection, from inspection data during processing processes for waveguide fabrication. Further, if a great deviation from the target waveguide mask width is confirmed, since the processing of the waveguide fabrication (step S309) by semiconductor etching is not yet carried out, it is possible to redo the processing processes of the waveguide fabrication. Accordingly, it is possible to prevent the reduction in yield during the wafer fabrication, and improvement in yield can be realized.

By the way, the waveguide fabrication processes illustrated in FIG. 3(A) exemplarily illustrates the case where the hard mask width is selected as an inspection target from the reason that it is closest to the waveguide fabrication. However, instead of this, the inspection target may be the resist mask width after exposure. However, when the resist mask width is selected as the target, it is necessary to determine the quality of the optical characteristics of the chip taking the conditions, variations, and the like during the processing of hard mask fabrication (step S304) into consideration. It is satisfactory that the inspection target is the mask width for MMI waveguide fabrication, such as hard mask width, resist mask width, or the like. Therefore, the mask width for waveguide fabrication is regarded as the inspection target, in the following description.

The waveguide fabrication illustrated in FIG. 3(A) is different from the general waveguide fabrication in that the mask width for waveguide fabrication is measured at least at one location for each chip. Therefore, the apparent inspection time will increase. However, carrying out the redoing will make it possible to revive. When the possibility that the occurrence of useless defective products can be reduced later as much as possible is taken into consideration, it is effective in reducing the manufacturing costs. Therefore, it can be said that the adverse effects in redoing are sufficiently small. Further, when the cost of redoing is taken into consideration, determining to redo the fabrication processes only when 10% or more chips on the wafer surface is determined to be defective in the determination of the quality of the optical characteristics of the mask width for waveguide fabrication, as mentioned above, is effective in cost.

In addition, if it is determined to measure the mask width for waveguide fabrication at least at one location for each chip, the mask width for waveguide fabrication will be measured at least at several hundreds of locations in the case of 3-inch wafer. Therefore, an automatic length-measurement scanning electron microscope (SEM) is required. When the width dependency of the MMI waveguide 3 is taken into consideration, it is desired that the resolution of the above-mentioned electron microscope (SEM) is 0.05 µm or less.

Further, it is desired to select the 1st-stage MMI waveguide 3 that most affects the characteristics in measuring the length of the mask width for waveguide fabrication at one location per chip. It is needless to say that another stage of MMI waveguide 3 may be selected. Further, in order to enhance the accuracy in determining the quality of the optical characteristics of the chip, it is desired to measure the length of the mask width for waveguide fabrication in all MMI waveguides 3. However, in such a case, there is a problem that the number of length measurements per wafer increases excessively. Therefore, when it is required to maintain the accuracy in determination of the quality of the optical characteristics of the chip, it can be said that it is most efficient to measure the length of the mask width for waveguide fabrication in one or more MMI waveguides 3 at least one stage in the longitudinal direction.

With reference to the polarization multiplexing type optical I/Q modulator 10 illustrated in FIG. 1(C), the most efficient selection of the MMI waveguide 3 will be specifically described. It indicates that, on the optical input side, the length measurement is carried out at one MMI waveguide 3 on the 1st-row line L1, any one of two MMI waveguides 3 on the 2nd-row line L2, and arbitrary one of four MMI waveguides 3 on the 3rd-row line L3, respectively. Further, it indicates, on the optical output side, the length measurement is carried out at arbitrary one of four MMI waveguides 3 on the 4th-row line L4, and arbitrary one of two MMI waveguides 3 on the 5th-row line L5, respectively.

Hereinafter, details of calculation of the optimum value of the waveguide mask width by the machine learning technique and determination of the quality of the optical characteristics of the chip will be described. In the calculation of the optimum waveguide mask width, as machine learning data, data of the mask width for waveguide fabrication, and data of three types or more optical characteristics after chip formation with the mask width for waveguide fabrication are required. The data of three types or more optical characteristics is, for example, data of three or more wavelengths including at least center wavelength, short wavelength, and long wavelength in the wavelength band to be used.

The reason why the above-mentioned data of three or more wavelengths is required is because the MMI waveguide 3 has wavelength dependency. For example, if the attention is paid to only one wavelength, in the case where only the long wave side is observed, bringing the long wave side into a better condition induces a situation that the optical characteristics deteriorate on the short wave side. As a result, a situation where a wrong optimum value of the waveguide mask width is found will be easily reached. Under these circumstances, the data of optical characteristics of three or more wavelengths including at least center wavelength, short wavelength, and long wavelength is required. As the data of optical characteristics, it is desired to use data of at least either the extinction ratio or the insertion loss, which are factors most affected by the waveguide mask width.

Hereinafter, specifically, a method for calculating the optimum value of the waveguide mask width by machine learning, when the data of optical characteristics used is the extinction ratio, will be described. However, here, a selection different from the selection pattern of the MMI waveguides 3 described with reference to FIG. 1(C) will be described.

First, in machine learning, it is necessary to construct regression models for three wavelengths of short wavelength (1527 nm), center wavelength (1550 nm), and long wavelength (1565 nm), respectively, in order to ensure the characteristics of the entire C-band wavelength. For example, a regression model for the wavelength j (j=1:1527 nm, j=2: 1550 nm, and j=3:1565 nm) is given by a relational expression $y_j = b_j - \Sigma\{I(m_i > t_{ij})w_{ij}^+ + I(m_i \leq t_{ij})w_{ij}^-\} x_{ij}$ [however, $\Sigma$ adds i=1 to 7] for dependent variable $y_j$.

However, the dependent variable $y_j$ in the above-mentioned relational expression is the extinction ratio in the case of wavelength j. And, i indicates a position where the MMI waveguide 3 is selected. For example, i=1 indicates that the first position is present in the 1st-stage MMI waveguide 3, i=2 indicates that the second position is present in the 2nd-stage MMI waveguide 3, and i=3, 4 indicates that the third position and the fourth position are present in the 3rd-stage MMI waveguide 3. Further, i=5, 6 indicates that the fifth position and the sixth position are present in the 4th-stage MMI optical waveguide 3, and i=7 indicates that the seventh position is present in the 5th-stage MMI waveguide 3. In addition, $m_i$ indicates the mask width for waveguide fabrication at an arbitrary position included in the relationship of the mask width for waveguide fabrication $m=(m_1, m_2, \ldots, m_i, \ldots, m_7)$ related to the MMI waveguide 3. Further, $t_{ij}$ is included in the relationship of the optimum value $t_j = (t_{ij}, \ldots, t_{ij}, \ldots, t_{7j})$ of the waveguide mask width related to the MMI waveguide 3 at an arbitrary position and represents the optimum value of the waveguide mask width for the wavelength j. And, $x_{ij}$ is included in the relationship of explanatory variable $x_j = (x_{1j}, \ldots, x_{ij}, \ldots, x_{7j})$, and indicates a value given by an error from the optimum value $t_{ij}$ of the waveguide mask width in the wavelength j of the i-th mask width for waveguide fabrication $m_i$. $I(m_i > t_{ij})$ indicates an indicator function and is 1 when $m_i > t_{ij}$ in the parentheses is satisfied and 0 when it is not satisfied. In addition, in the relationship of a parameter $w_j = (b_j, w_{ij}^+, \ldots, w_{ij}^+, \ldots, w_{7j}^+, \ldots, w_{1j}^-, \ldots, w_{ij}^-, \ldots w_{7j}^-)$ given by positive numbers of the regression model, $w_{ij}^+$ and $w_{ij}^-$ are weighting, + notation indicates an increase, and − notation indicates a reduction. Further, $b_j$ included in the parameter $w_j$ is a constant given for each wavelength j. Here, it is assumed that the extinction ratio becomes smaller as the i-th mask width for waveguide fabrication $m_i$ deviates from the optimum value $t_{ij}$ of the waveguide mask width. Further, in the regression model, all the elements of the parameter $w_j$ are constrained to be 0 or more and learned from observation data, and the quality of the optical characteristics of the chip is predicted and determined.

Using such a regression model, the optimum value of the waveguide mask width is calculated according to the following procedures 1) to 3). In the procedure 1), by a cross confirmation (also called cross-validation) that is a common method of machine learning, the mask width for waveguide fabrication related to the MMI waveguide 3 that minimizes the predicted error of the extinction ratio is estimated for each wavelength j, as an estimated value of the optimum value $t_{ij}$ of the waveguide mask width. The cross-validation is a generally known technique in the machine learning using statistical processing, and the outline thereof is described, for example, on the site "https://mathwords.net/kousakakunin, https://ja.wikipedia.org/wiki/%E4%BA%A4%E5%B7%AE%E6%A4%9C%E8%A8%BC" or the like.

In the procedure 2), an estimated value of the optimum value of the parameter $w_j$ in the regression model in the case of using the estimated value of the optimum value $t_{ij}$ of the waveguide mask width related to the MMI waveguide 3 for each wavelength j is estimated. In the procedure 3), the waveguide mask width related to the MMI waveguide 3 that maximizes an average of estimated values of the extinction ratio for a plurality of wavelengths calculated using the regression model is estimated as optimum value $m_{opt}$. Applying the analysis method of such procedures 1) to 3) can calculate the optimum value $t_{ij}$ of the waveguide mask width related to the MMI waveguide 3 that is the best in extinction ratio, when the three wavelengths are comprehensively viewed.

The analysis method described here is a mere example and shows only the case of extinction ratio. However, it is also possible to calculate the optimum value $t_{ij}$ of the waveguide mask width related to the MMI waveguide 3 based on the insertion loss. Even in this case, the analysis method of the above-mentioned procedures 1) to 3) can be applied, and the optimum value $t_{ij}$ of the waveguide mask width related to the MMI waveguide 3 that minimizes an average of estimated values of the insertion loss may be calculated in the procedure 3). The reason is that, in the optical characteristics, the larger the extinction ratio value, the better the characteristics, and the smaller the insertion loss value, the better the characteristics. In this manner, the width of the MMI waveguide 3 can be optimized based on either the extinction ratio or the insertion loss. Further, it can be said it is most desirable to calculate the optimum value $t_{ij}$ of the waveguide mask width related to the MMI waveguide 3 so that both of the extinction ratio and the insertion loss are optimized, set the waveguide mask width, and optimize the waveguide mask width. The regression model includes multiple regression models using the least squares method known in statistical processing, and application to such multiple regression models is feasible. Accordingly, regression model is not limited to the disclosed contents.

In any case, in order to realize reliable determination of the quality of the optical characteristics, the quality of sample data of the optical modulator created in advance as a database is important. It is desired to create the sample data, from about 1000 chips, by using optical characteristic data of sample chips obtained in advance by swinging the width of the MMI waveguide 3 in a range of ±2 to 3% as well as data of the waveguide mask width. Further, the permissible range of the sample data may be set so as to correspond to a deviation of the mask width for waveguide fabrication that has exceeded the above-mentioned±2 to 3%. This is a viewpoint necessary when enhancing the accuracy in analysis on statistical processing and the quality of the determination of the optical characteristics. It is desired to arbitrarily change the degree specifying the frequency of indicating defective optical characteristics, for the refabrication of the mask, depending on the situation. The MZ optical modulator described with reference to FIG. 2 and the polarization multiplexing type optical I/Q modulator 10 described with reference to FIG. 1 and FIGS. 3(A) and 3(B) can be regarded as exemplarily illustrating optical modulators to be manufactured in the present embodiment. However, in such cases, the substrate material with indium phosphide InP is used as a base. As described above, gallium arsenide GaAs, silicon Si or the like may be used as other alternative materials.

The technique relating to the machine learning applied to the chip quality determination step can be summarized as follows. That is, in the chip quality determination step, calculation of the optimum value of the waveguide mask width uses the regression models constructed for the mask width for waveguide fabrication to be measured and the optical characteristics, respectively. Further, the chip quality determination step carries out first processing for estimating the optimum value of the waveguide mask width that minimizes the predicted errors of the optical characteristics by the cross-validation method, for each wavelength, as an estimated value. Further, the chip quality determination step carries out second processing for estimating the estimated value of the optimum value of the parameter of the regression model when the estimated value of the optimum value for each wavelength is used. Further, the chip quality determination step carries out third processing for estimating, as an optimum value, the waveguide mask width that maximizes or minimizes the average of estimated values of the optical characteristics for a plurality of wavelengths calculated using the regression model.

In the above-mentioned chip quality determination step, at least either the extinction ratio or the insertion loss represents the optical characteristics. When the extinction ratio represents the optical characteristics, the third processing is performed in such a way as to maximize the average of estimated values of the optical characteristics. On the other hand, when the insertion loss represents the optical characteristics, it is performed in such a way as to minimize the average of estimated values of the optical characteristics. In such cases, in the chip quality determination step, the optical characteristics shall be wavelength data, at least, including center wavelength, short wavelength, and long wavelength of the wavelength band used by the optical modulator. In addition, the third processing estimates, as an optimal width, the waveguide mask width that is the best in at least either the extinction ratio or the insertion loss in the wavelength data.

According to the optical modulator manufacturing method described above, in order to realize good optical characteristics, the mask width for waveguide fabrication is measured at least at one location, considering the entire wavelength band used for fabricating the MMI optical waveguide 3 during the waveguide fabrication. Further, the sample data created in advance by analyzing the relationship between the mask width for waveguide fabrication and the optical characteristics of the optical modulator by machine learning is used. That is, the quality of the optical characteristics of the chip is predicted and determined in advance depending on whether the measured mask width for waveguide fabrication is present in the permissible range of the sample data. If the prediction determination result indicates that the frequency of indicating defective optical characteristics reaches the predetermined degree, the waveguide fabrication is redone. As a result, the chip quality of the optical modulator having the MMI waveguide 3 can be determined during manufacturing, the reduction in yield during the wafer fabrication can be prevented, and improvement in yield can be realized.

The invention claimed is:

1. A method for manufacturing an optical modulator having a multi-mode interference waveguide, the method comprising:
    a mask width length measurement step of measuring a mask width for waveguide fabrication used for fabricating the multi-mode interference waveguide existing in a chip of the optical modulator, at least at one location;
    a chip quality determination step of predicting and determining the quality of optical characteristics of the chip in advance, based on sample data of the optical modulator created in advance by analyzing a relationship between the mask width for waveguide fabrication and optical characteristics of the optical modulator by machine learning, depending on whether the mask width for waveguide fabrication measured in the mask width length measurement step is present in a permissible range of the sample data; and
    a mask refabrication step of redoing mask fabrication when the mask width for waveguide fabrication measured in the mask width length measurement step deviates from a target waveguide mask width, if a prediction determination result in the chip quality determination step indicates that the frequency of indicating defective optical characteristics reaches a predetermined degree.

2. The optical modulator manufacturing method according to claim 1, wherein
    the mask width length measurement step measures the mask width for waveguide fabrication at least at one location of all stages existing in the chip of the optical modulator, and
    the chip quality determination step predicts and determines the quality of the optical characteristics of the chip using the mask width for waveguide fabrication at least at one location of all stages.

3. The optical modulator manufacturing method according to claim 1, wherein the mask refabrication step redoes the mask refabrication when the mask width for waveguide fabrication deviates from a target waveguide mask width by 10% or more in the number of chips on the wafer surface that forms the chip.

4. The optical modulator manufacturing method according to claim 1, wherein the chip quality determination step calculates an optimum value of the waveguide mask width by the machine learning based on the mask width for waveguide fabrication measured in the mask width length measurement step and at least three types of optical characteristics of the optical modulator.

5. The optical modulator manufacturing method according to claim 4, wherein the chip quality determination step performs first processing for estimating the optimum value of the waveguide mask width that minimizes predicted errors of the optical characteristics by a cross-validation method, for each wavelength, as an estimated value, using regression models constructed for the mask width for waveguide fabrication to be measured and the optical characteristics, respectively, when calculating the optimum value of the waveguide mask width, second processing for estimating an estimated value of the optimum value of a parameter of the regression model when the estimated value of the optimum value for each wavelength is used, and third processing for estimating, as an optimum value, the waveguide mask width that maximizes or minimizes an average of estimated values of the optical characteristics for a plurality of wavelengths calculated using the regression model.

6. The optical modulator manufacturing method according to claim 5, wherein
in the chip quality determination step, at least either extinction ratio or insertion loss represents the optical characteristics, and
the third processing is performed in such a way as to maximize the average of estimated values of the optical characteristics when the extinction ratio represents the optical characteristics, and is performed in such a way as to minimize the average of estimated values of the optical characteristics when the insertion loss represents the optical characteristics.

7. The optical modulator manufacturing method according to claim 6, wherein
in the chip quality determination step, the optical characteristics are wavelength data, at least, including center wavelength, short wavelength, and long wavelength of a wavelength band used by the optical modulator, and
the third processing estimates, as an optimal width, the waveguide mask width that is the best in at least either the extinction ratio or the insertion loss in the wavelength data.

8. The optical modulator manufacturing method according to claim 1, wherein a target to be manufactured as the optical modulator is a Mach-Zehnder type modulator or a polarization multiplexing type optical I/Q modulator, which is configured by a substrate material selected from InP, GaAs, and Si and serving as a base.

* * * * *